(12) United States Patent
Dixon

(10) Patent No.: US 7,062,796 B1
(45) Date of Patent: Jun. 20, 2006

(54) PERISCOPE SWIM GOGGLES

(76) Inventor: Philip Allan Dixon, 17795 Beargrass MTN Rd., Missoula, MT (US) 59808

( * ) Notice: Subject to any disclaimer, the term of this patent is extended or adjusted under 35 U.S.C. 154(b) by 53 days.

(21) Appl. No.: 11/108,280

(22) Filed: Apr. 18, 2005

(51) Int. Cl.
*A61F 9/02* (2006.01)

(52) U.S. Cl. ............. 2/426; 2/427; 2/428; 2/431; 2/445; 2/452

(58) Field of Classification Search .......... 2/428, 2/429, 430; 351/43, 158; 359/879, 402; 441/136
See application file for complete search history.

(56) References Cited

U.S. PATENT DOCUMENTS 2,909,959 A * 10/1959 Girden ............... 2/427
5,124,848 A * 6/1992 Capilupi, Jr. ........ 359/861
5,585,871 A * 12/1996 Linden .............. 351/158

6,122,100 A * 9/2000 Miller .............. 359/402

* cited by examiner

Primary Examiner—John J. Calvert
Assistant Examiner—Alissa J. Tompkins

(57) ABSTRACT

Periscope Swim Goggles are swimmer's goggles with a periscope situated above the water line that projects the view that is ahead of the swimmer through a fiber optic cable to a viewer located on the goggle's eyepiece. Generally, an open-water swimmer using the free style or crawl stroke must occasionally sight on a landmark to swim toward. Periscope Swim Goggles would enable the swimmer to continually swim directly along the desired path without lifting the head for sighting. Conventional swimming goggles are typically comprised of two eyepieces contoured and gasketed for an air-tight fit around each eye socket and an elastic strap that wraps around the head holding the eyepieces tight to the face. In one embodiment of the invention, the periscope is positioned and secured at the back of the head by the elastic strap of the goggles. The fiber optic cable leaves the periscope and follows the elastic strap to the viewer which is mounted to the front of the eyepiece.

3 Claims, 6 Drawing Sheets

FIG. 3a
FIG. 3b
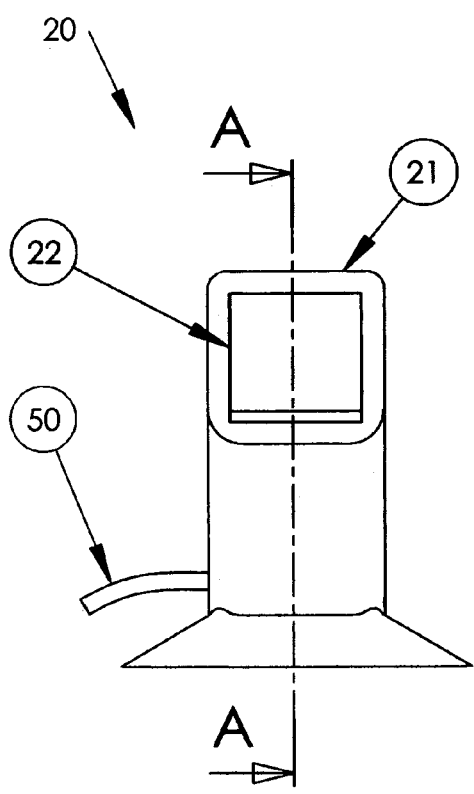
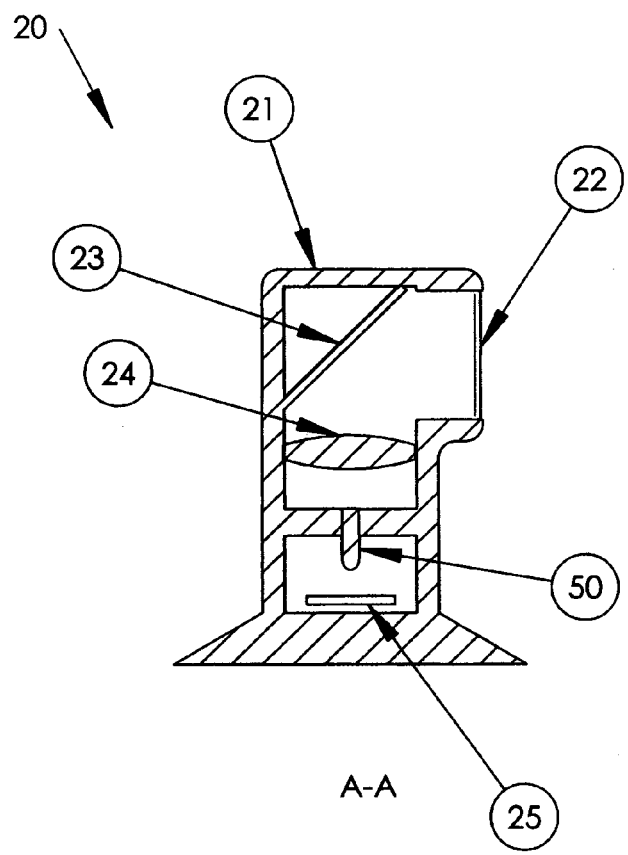
A-A

FIG. 4a
FIG. 4b
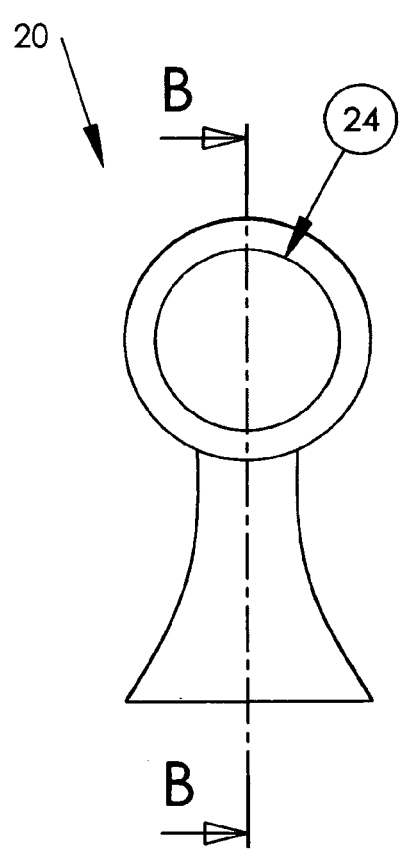
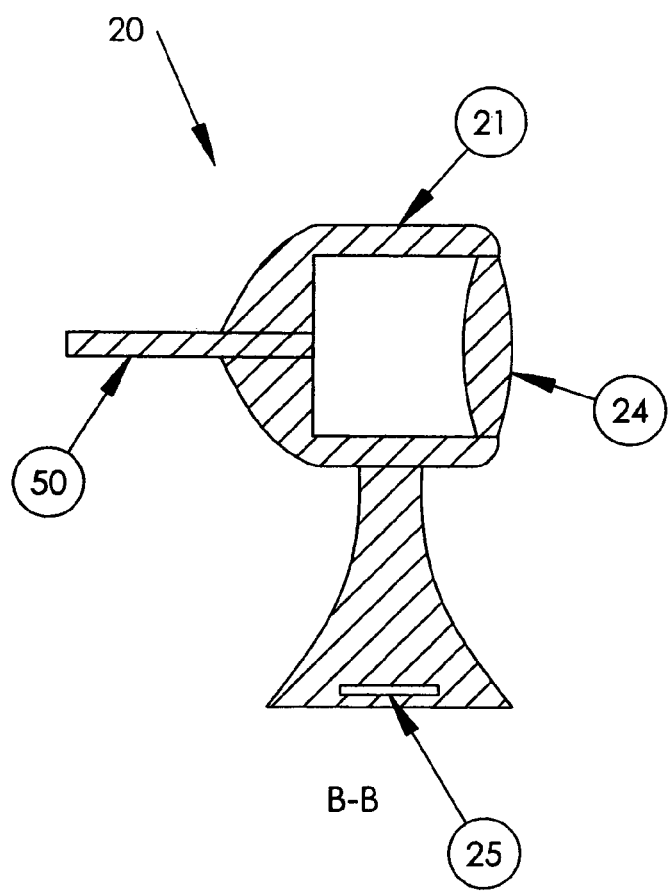

PERISCOPE SWIM GOGGLES

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of water sports and more specifically to swim goggles with periscope for viewing landmarks above the water line ahead of the swimmer.

Open-water swimmers using the free style swim stroke are face-down in the water and must necessarily raise their head out of the water periodically to sight a distant object to swim toward. A swimmer who does not do this frequently enough will quickly diverge from a straight-line path. For a free style swimmer, lifting one's head from the water causes the body to tilt from the preferred attitude of level swimming to an inclined position with head out of the water and legs sinking down. This immediately causes a loss of momentum by the increased frontal area of the swimmer and, in addition, during this interim, the swimmer is no longer performing the arm strokes and leg kicks that would continue to propel the body forward. Given the apparatus to allow the swimmer to continually see the target path for swimming without raising the head allows for the fastest swim by always progressing along a straight path without the interruption of raising the head to look forward and the resultant deceleration. This would be very beneficial to all swimmers in open water primarily triathletes.

U.S. Pat. No. 5,170,190 Water Sportsman's Face Mask For Viewing Objects Above and Below the Line of Vision describes a set of prisms built into the front of a swimming mask which reflect light from above or below the swimming mask into the swimmer's eyes. As the image is only from directly above or directly below the frontal plane of the mask, it would be without merit for seeing above the waterline into the distance.

U.S. Pat. No. 2,909,959 Swimming Face Mask with Periscope illustrates a swimming mask with a large boxlike portion extending from the top of the mask over the swimmer's head. Mirrors in the top and bottom of the periscope bring the image in front of the swimmer into the field of view of the wearer. Due to its large frontal area, this device would be inappropriate for competitive swimmers due to the significant drag effects.

U.S. Pat. No. 6,006,367 Swimming Goggles relates a prism built into the top of swimming goggles that bends the light that is above the plane of the goggles down into the swimmer's view of vision. This arrangement allows the swimmer to see directly in front when swimming in the face-down position of the free style stroke, although the forward view is below the surface of the water. In open water, i.e. lakes or oceans, the viewing distance would be quite limited and of no value for geographical orientation in the water.

U.S. Pat. No. 5,029,963 Replacement Device for a Driver's Viewer demonstrates an elaborate system that redirects a desired visual field into eyewear for motorists, but it doesn't lend itself to a light simple design for swimmers' needs.

U.S. Pat. No. 5,103,713 Imaging Target Sight describes an optical system employing lensing and fiber optics to bring the image of the gunner's target to the gunner's eye for aiming missiles.

U.S. Pat. No. 5,585,871 Multi-Function Display Apparatus describes swimming goggles with optical coupling of a remote transmitter of displayed data to the front portion of the goggles for viewing by the wearer.

Prior technology does not adequately provide for the presentation of the forward field of view above the water line for a prone, face-down swimmer. Inadequacies include excessive or bulky parts, vision only below the water line, or views other than frontal.

BRIEF SUMMARY OF THE INVENTION

The primary object of the invention is the ability to see distant objects or landmarks above the surface of the water in the direction of travel for a swimmer in the prone, face-down orientation employing the free style or crawl swim stroke, most common for open-water swimmers.

Another object is the construction of goggles with optical parts integrated therein or the alternative of a retrofit so swimmers can continue to use their favorite goggles with the added advantage of above-water vision.

In accordance with a preferred embodiment of the invention, there is disclosed Periscope Swim Goggles comprising: conventional swimmers goggles with a periscope situated on the back of the swimmer's head for above-water viewing during the crawl or free-style stroke, fiber optic cable to transmit the image from the periscope, and viewer located at the front of the goggle's eyepiece that receives the image via the fiber optic cable for observation by the swimmer.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention. Embodiments of this invention will now be described by way of example in association with the accompanying drawings in which:

FIG. 3a is a front view of the periscope portion of the present invention.

FIG. 3b is a side cross-sectional view of the periscope portion of the present invention.

FIG. 4a is a front view of the periscope portion of an alternate embodiment of the present invention.

FIG. 4b is a side cross-sectional view of the periscope portion of an alternate embodiment of the present invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
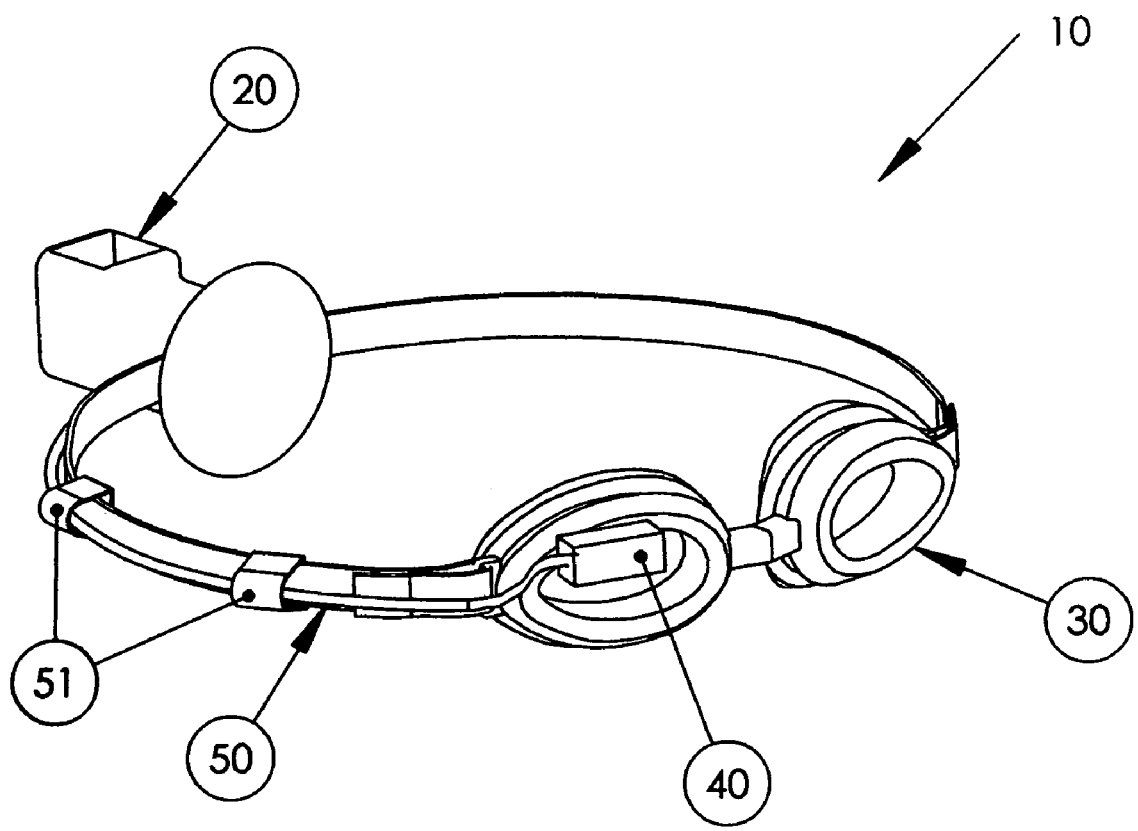
FIG. 1 is a perspective view of a Periscope Swim Goggles in accordance with the principles of the present invention.

Referring to the drawings in detail as shown in FIG. 1 is the preferred embodiment of the present invention. The Periscope Swim Goggles 10 is comprised of swim goggles 30, periscope 20, fiber optic cable 50, keeper loops 51, and viewer 40.

Figure 2:
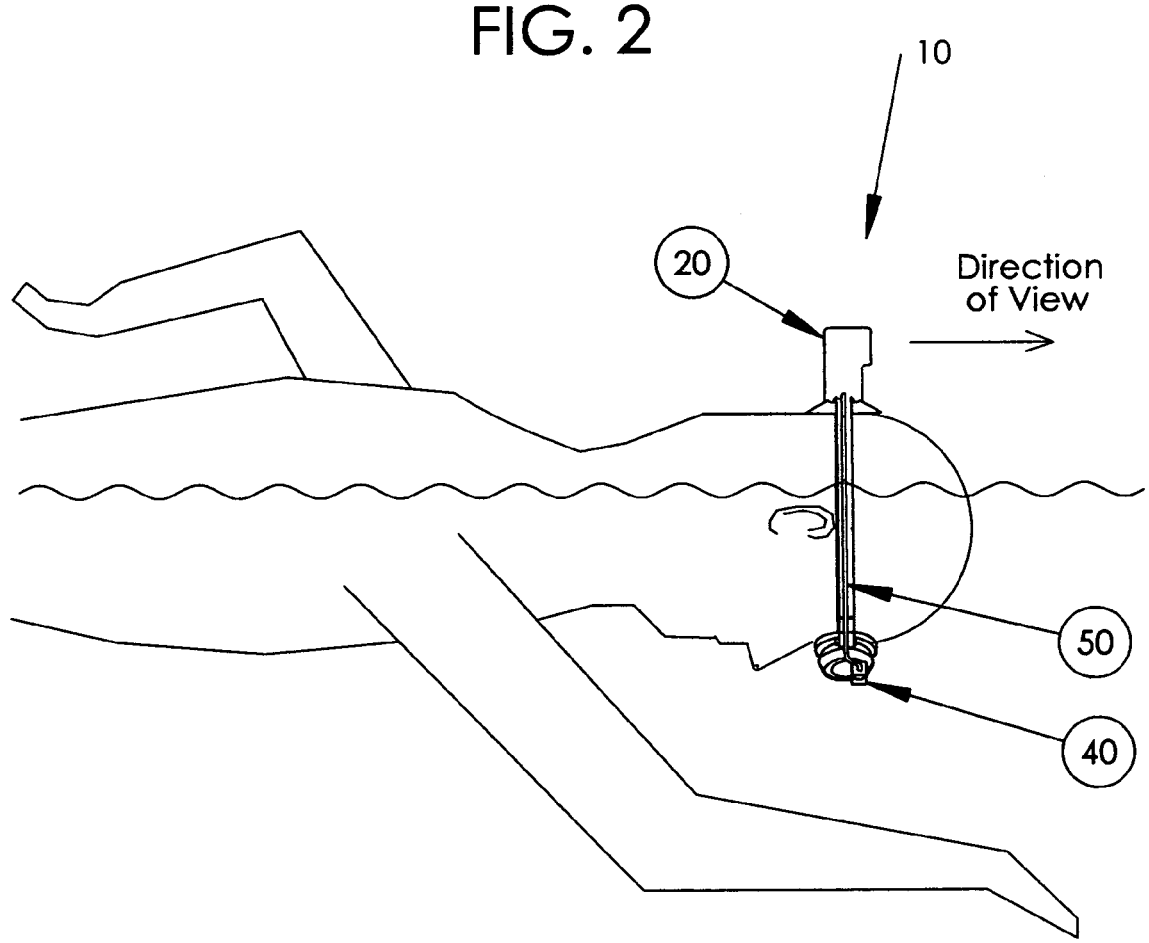
FIG. 2 is a side view of a swimmer demonstrating the typical use of the present invention.

FIG. 2 shows the preferred embodiment of the present invention used by a swimmer in a typical application. The swimmer is wearing Periscope Swim Goggles 10 with the periscope 20 positioned at the back of the swimmer's head above the water line and facing forward. The view directly in line with and in front of the swimmer is presented to the periscope 20. The image entering periscope 20 is transmitted through fiber optic cable 50 and into viewer 40 where it may be observed by the swimmer.

FIGS. 3a and 3b detail the periscope 20 portion of the present invention. FIG. 3a illustrates a frontal view of periscope 20 and a section line A—A cut through periscope 20 to generate cross-sectional side view of periscope 20 shown in FIG. 3b. Periscope 20 is comprised of housing 21 manufactured of rigid and durable material to enclose and protect the contents. Housing 21 has a flared base for stability on the wearer's head. Housing 21 features an elastic strap hole 25 for the elastic headband of the swim goggles 30 to pass through to secure and stabilize periscope 20. Light reflected and emanating from objects enters periscope 20 through transparent window 22. Transparent window 22 may include a tinted or polarizing filter to improve image quality. The light passing through window 22 reflects downward off of mirror 23 and into objective lens 24. Objective lens 24 focuses the parallel rays of light into the polished end of fiber optic cable 50 which is positioned at the focal distance of objective lens 24. Fiber optic cable 50 is a bundle of many thousands of individual glass or plastic optical fibers. The bundle of strands is maintained in the same predetermined order from end to end to preserve an image transmitted into one end of the bundle to the other. As fiber optic cable 50 is exposed after it passes out of housing 21, it is jacketed in a flexible protective sheath.

In FIGS. 4a and 4b, an alternative configuration for periscope 20 is shown. FIG. 4a illustrates a frontal view of periscope 20 and a section line B—B cut through periscope 20 to generate cross-sectional side view of periscope 20 shown in FIG. 4b. This embodiment features the omission of mirror 23 (as shown in FIG. 3b) that redirected the image downward into the objective lens 24 and instead places objective lens 24 in a vertical orientation in the place of window 22 (as shown in FIG. 3b), also omitted in this embodiment. Objective lens 24 receives the light from in front of the swimmer and focuses it into fiber optic cable 50 repositioned directly behind.

Referring back to FIG. 1, the fiber optic cable 50 leaves periscope 20 and follows the elastic headband of goggles 30 before entering viewer 40 located at a position convenient for viewing upon one eyepiece of goggles 30. Keeper loops 51 hold fiber optic cable 50 in a secure and convenient manner. Keeper loops 51 may be constructed of any flexible, waterproof material and, instead of individual loops, may take the form of a continuous sheath.

Figure 5:
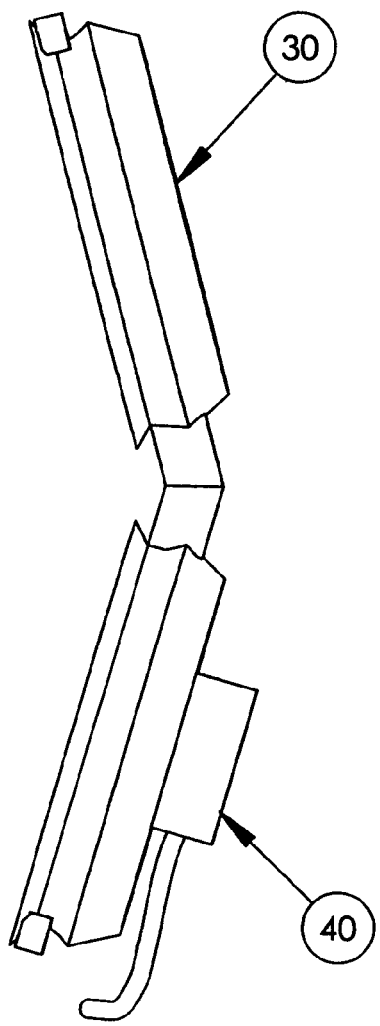
FIG. 5 is a top view of goggles representing a location for the viewer portion of the present invention.

Turning now to FIG. 5, there is shown a top view of swim goggles 30 disclosing a position of viewer 40 on the eyepiece of swim goggles 30 in a position directly in front of and above (as shown in FIG. 1) the wearer's eye.

Figure 6:
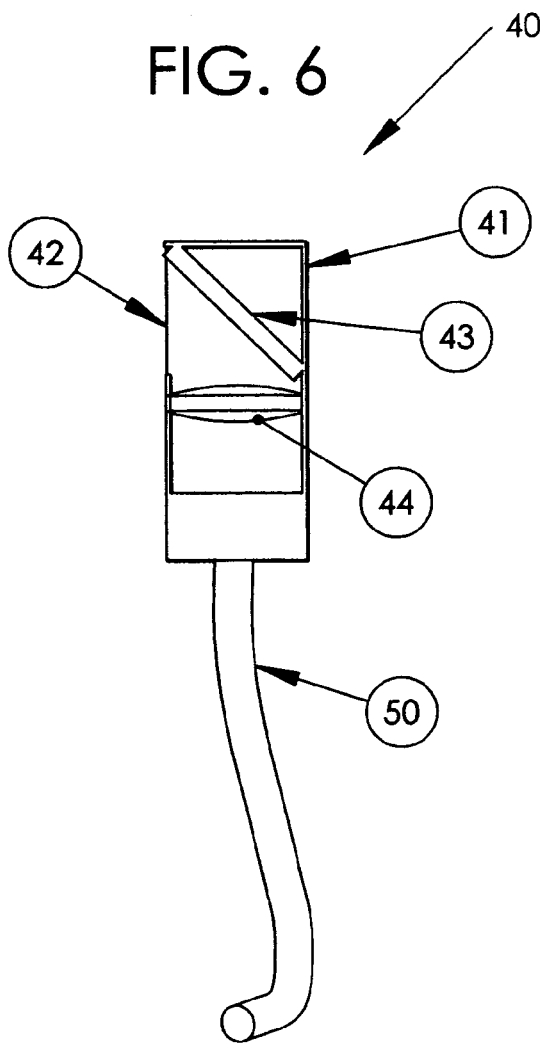
FIG. 6 is a top cross-sectional view of the viewer portion of the present invention.

FIG. 6 shows a cross-sectional top view of viewer 40. The fiber optic cable 50 carries the image into viewer housing 41 where the fiber optic cable 50 is secured with its polished end at the focal distance of collimating lens 44. Collimating lens 44 focuses the light emitted from fiber optic cable 50 into mirror 43. Mirror 43 reflects the image through transparent window 42 into the field of view for the wearer.

Figure 7:
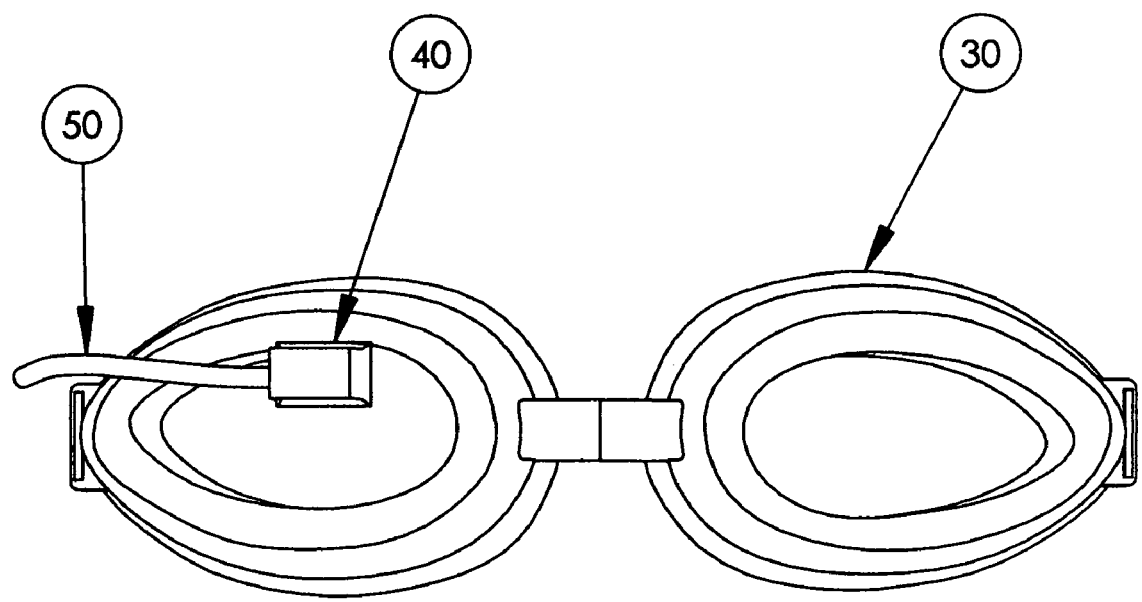
FIG. 7 is a front view of the goggles with the viewer portion molded directly onto the goggle's eyepiece.

In the preceding descriptions, the viewer 40 has been described as a component that is fastened to the goggle's eyepiece using clips or adhesive. FIG. 7 shows an alternate configuration whereas the viewer 40 is molded directly onto the eyepiece of the goggles 30.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Periscope Swim Goggles comprising:
    periscope situated on the back of the swimmer's head for above-water and forward viewing while wearing conventional swimming goggles;
    fiber optic cable to transmit the image from the periscope;
    keeper loops that secure the fiber optic cable to the elastic strap of the swimming goggles; and
    viewer which is attached to the eyepiece of the swimming goggles which receives the image via the fiber optic cable for observation by the swimmer.

2. A Periscope Swim Goggles as claimed in claim 1 further comprising a periscope that omits the mirror to redirect the image downwardly into the objective lens and instead uses an objective lens inline with the direct path of the swimmer receiving the distant image and focusing it into the fiber optic cable.

3. A Periscope Swim Goggles as claimed in claim 1 further comprising a viewer molded directly into the goggle's eyepiece.

* * * * *